June 10, 1947.  L. FRANK  2,422,005
FOOD CHOPPER
Filed April 19, 1944
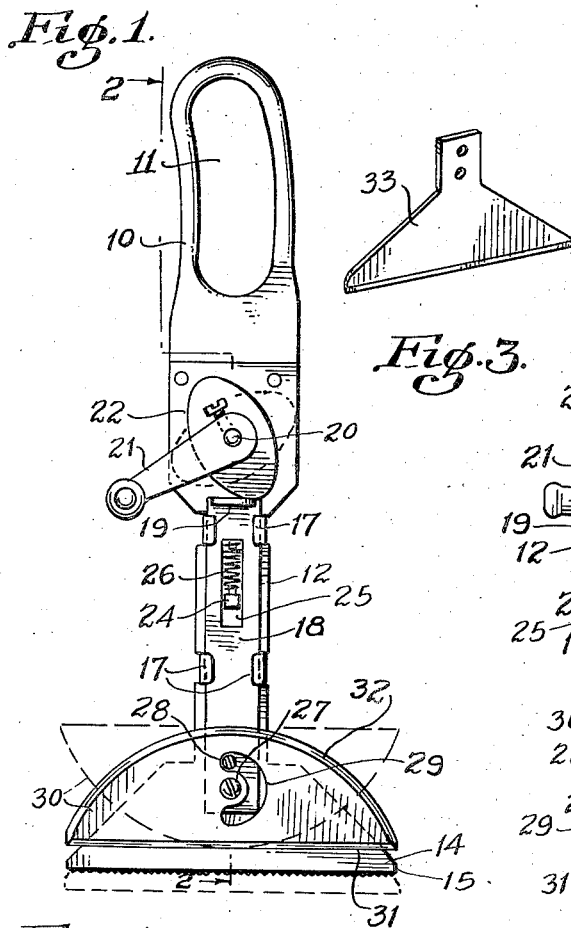
INVENTOR.
LOUIS FRANK
BY
Martin G. Smith
ATTORNEY.

Patented June 10, 1947

2,422,005

UNITED STATES PATENT OFFICE 2,422,005

FOOD CHOPPER

Louis Frank, Fellows, Calif.

Application April 19, 1944, Serial No. 531,688

4 Claims. (Cl. 30—272)

My invention relates to a culinary appliance particularly designed for chopping food and for rendering meat tender and the principal objects of my invention are to generally improve upon and simplify the construction of the existing forms of similar devices and to provide the appliance with a plurality of cutting blades which are reversible, thereby enabling food to be chopped on a flat surface, or the concave face of a bowl.

A further object of my invention is to provide a utensil of the character referred to having means including a crank shaft and a pair of double eccentrics carried thereby, which will be effective in producing four strokes of the blades with each complete rotation of the crank shaft.

A further object of my invention, is to construct the device so that cutting blades and meat tendering elements may be interchangeably used thereon.

With the foregoing and other objects in view, my invention consists in certain novel features of construction and arrangement of parts which will be hereinafter more fully described and claimed and illustrated in the accompanying drawings, in which Fig. 1 is a side elevational view of a utensil constructed in accordance with my invention.

Fig. 2 is a vertical section taken approximately on the line 2—2 of Fig. 1.

Fig. 3 is a perspective view of a modified form of one of the food chopping blades.

Fig. 4 is a vertical section taken appoximately on the line 4—4 of Fig. 2.

Fig. 5 is a perspective view of one of the double eccentrics.

Fig. 6 is a perspective view of a single cam which may be used in the utensil.

Fig. 7 is a side elevational view of one of the meat tendering elements.

Fig. 8 is a view looking at the under face of one of the meat tenderers.

Fig. 9 is an end view of one of the meat tendering members, and showing same applied to its reciprocating carrier bar.

Referring by numerals to the accompanying drawings which illustrate a preferred embodiment of my invention, 10 designates a vertically disposed handle having an opening 11 for the users fingers and formed integral with or fixed to the lower end of said handle are depending parallel bars 12, the lower ends of which are united by a block 13.

This block normally occupies the upper portion of a chamber 14 formed in a base block 15 and expansive coil springs 16 are arranged between the under face of block 13 and the bottom wall of block 15, (see Fig. 4). The underface of block 15 is preferably corrugated to prevent slippage on smooth surfaces.

Thus the base block is yieldingly mounted on the lower ends of bars 12.

Mounted to slide vertically on the outer faces of bars 12 and retained thereon by overlapping lips 17 are bars 18 and projecting from the upper ends thereof, are lugs 19.

Journalled for rotation in the upper portions of bars 12 is a shaft 20, carrying on one end a crank handle 21 and secured on said shaft outside the bars are substantially oval shaped eccentrics 22, the major axes of which are disposed 90 degrees apart. These eccentrics bear on the lugs 19.

Arranged between and secured to plates 12 is a block 23 and seated in and projecting from the sides thereof are studs 24, which occupy vertical slots 25 in bars 18 and expansive coil springs 26 are located between said studs and the upper ends of said slots thus yieldingly resisting downward movement of said bars 18.

Detachably secured to the lower portion of each bar 18 by clamping screws 27 and 28, the latter one of which passes through a slot 29, 180 degrees in length and concentric with screw 27, is a blade 30 having a straight edge 31 and a curved edge 32.

Slot 29 enables the blade to be turned upside down so at to use the straight edge 31 on flat surfaces or the curved edge 32 in the concave surfaces of a bowl.

In the use of my improved utensil, the same is held in an upright position by one hand and with the other hand, crank handle 21 is engaged and rotated thereby rotating the double eccentrics 20 so as to cause each bar 18 to make two downward strokes with each complete rotation of the crank shaft.

The underface of block 15 rests on the surface on which the foodstuff is being chopped, or upon the foodstuff itself and as a result of the rapid strokes of the blade the meat or other foodstuff will be quickly chopped to the desired degree of fineness.

Spring 16 provides a yielding support for the utensil while same is in use and springs 26 lift the blade carrying bars 18 after same have been moved downward by the eccentrics.

If desired, blades such as 33 each having a single straight sharp edge as illustrated in Fig. 3, may be mounted on the lower ends of the bars 18 and for pounding and tendering meat a block 34 provided on its under face with studs 35 may be attached to the lower ends of said bars by means of a plate 37 which projects upwardly from one side of said block and is provided with apertures 38 for reception of the screws 27 and 28, (see Figs. 7 and 8 and 9).

In Fig. 6 I have shown a single cam 39 which may be used in place of each eccentric 22 each cam being provided with an eccentrically disposed aperture 36a for reception of shaft 20. These cams may be secured to shaft 20 by suitable means.

The handle with the upright opening provides convenient means for holding the device in proper position for use and also enables said device to be conveniently suspended from a hook, nail or the like.

Thus it will be seen that I have provided a food chopping and meat tendering device which is simple in structure, inexpensive of manufacture and very effective in performing the functions for which it is intended.

It will be understood that minor changes in the size, form and construction of the various parts of my improved food chopper and meat tenderer may be made and substituted for those herein shown and described without departing from the spirit of my invention the scope of which is set forth in the appended claims.

I claim as my invention:

1. In a food chopper and meat tenderer, a handle, a body depending from said handle, bars arranged for sliding movement on the sides of said body, a crank shaft mounted for rotation in said body above said bars, eccentrics carried by said crank shaft and engaging said bars, blades carried by the lower portions of said bar and springs for yieldingly resisting downward movement of said blade carrying bars.

2. A food chopper and meat tenderer as set forth in claim 1 and each of which blades is provided with a straight cutting edge and a curved cutting edge.

3. A food chopper and meat tenderer as set forth in claim 1 with a foot piece mounted for sliding movement on the lower end of said body and an expansive spring arranged between said foot piece and body.

4. In a food chopper and meat tenderer, a handle, a body depending from said handle, bars mounted for sliding movement on said depending body, a crank shaft mounted for rotation in said body above the sliding bars, eccentrics carried by said crank shaft for actuating said sliding bars, means for yieldingly resisting downward movement of said sliding bars and means detachably mounted on the lower ends of said sliding bars for engaging and acting upon foodstuffs.

LOUIS FRANK.

REFERENCES CITED

The following references are of record in the file of this patent:

UNITED STATES PATENTS

| Number | Name | Date |
|---|---|---|
| 231,187 | Norton | Aug. 17, 1880 |
| 2,113,085 | Higgs | Apr. 5, 1938 |
| 759,893 | Knutsen | May 17, 1904 |
| 2,141,565 | Stilson | Dec. 27, 1938 |
| 519,000 | Kull | May 1, 1894 |
| 210,503 | Coulter | Dec. 3, 1878 |
| 2,295,186 | Schwarzmayr | Sept. 8, 1942 |
| 891,871 | Smith | June 30, 1903 |
| 653,366 | Skinner | July 10, 1900 |